US006588479B1

United States Patent
Kliskey

(10) Patent No.: US 6,588,479 B1
(45) Date of Patent: Jul. 8, 2003

(54) TIRE WORKING TOOL

(75) Inventor: Roger Kliskey, Brimfield, OH (US)

(73) Assignee: Summit Tool Company, Akron, OH (US)

( * ) Notice: Subject to any disclaimer, the term of this patent is extended or adjusted under 35 U.S.C. 154(b) by 341 days.

(21) Appl. No.: 09/694,909

(22) Filed: Oct. 24, 2000

(51) Int. Cl.⁷ .............................................. B60C 25/02
(52) U.S. Cl. ...................... 157/1.3; 157/1.17; 157/1.1; 157/6; 81/152
(58) Field of Search ...................... 157/1.1, 1.3, 1.17, 157/6; D8/14, 31, 89, 88; 254/50.1, 27, 131, 131.5; 81/15.2, 121.1, 124.2, 124.7, 125.1, 448; 29/273

(56) References Cited

U.S. PATENT DOCUMENTS

| 1,100,032 A | * | 6/1914 | Speck ........................ 157/1.3 |
| 1,829,804 A | * | 11/1931 | Loomis et al. ............. 157/1.33 |
| D134,799 S | * | 1/1943 | Taylor ....................... 157/1.3 |
| D395,809 S | * | 7/1998 | Brown et al. ................. D8/31 |
| 6,179,032 B1 | | 1/2001 | Diez .......................... 157/1.1 |
| 6,182,735 B1 | | 2/2001 | du Quesne ................ 157/1.17 |
| 6,192,959 B1 | | 2/2001 | Spaggiari ................... 157/1.28 |

* cited by examiner

Primary Examiner—Joseph J. Hail, III
Assistant Examiner—Anthony Ojini
(74) Attorney, Agent, or Firm—Renner, Kenner, Greive, Bobak, Weber & Taylor

(57) ABSTRACT

A tool for demounting a first and a second bead of a tire mounted on a rim, the tool comprising a handle having a first end for disengaging a first tire bead from a rim and a second opposite end for disengaging a second tire bead from the rim. The first handle end includes a heel extending radially outward from the handle; an elongate arm portion extending radially outward from the heel and forming a forward opening crook; a raised arm portion disposed adjacent the crook; and a tip extending radially outward from the body portion. The opposite second end of the tool handle is configured to disengage a second bead of the tire from the rim and includes a heel extending radially outward from the handle; an elongate lever arm portion extending radially outward from the heel and defining an open crook adjacent the heel; and an elongate raised arm portion adjacent the crook extending outward to a tip portion.

53 Claims, 17 Drawing Sheets

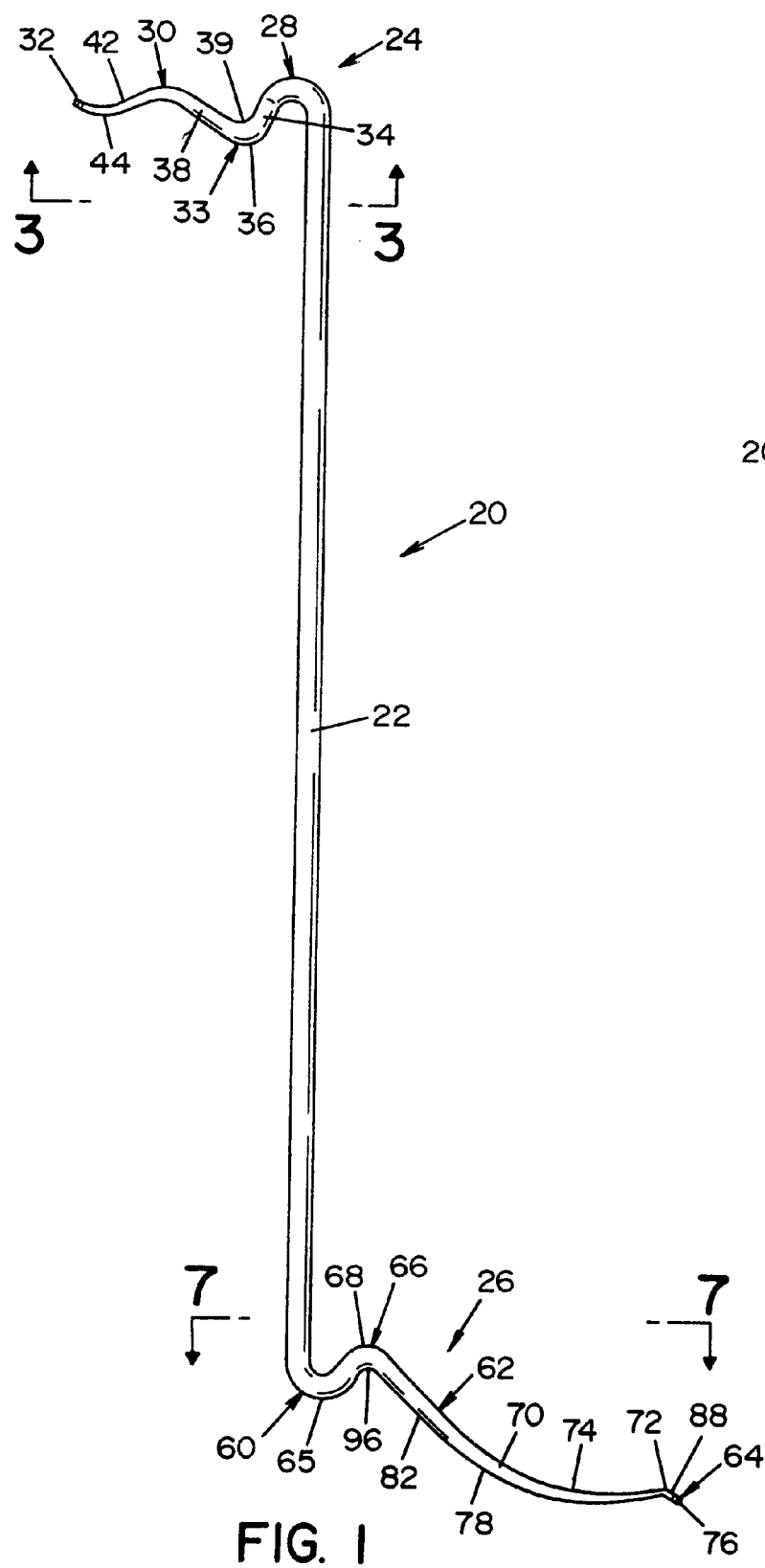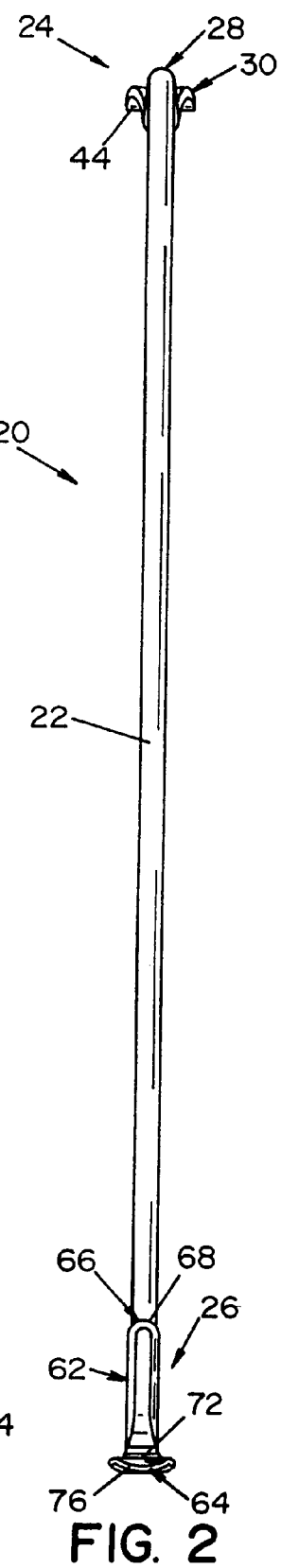

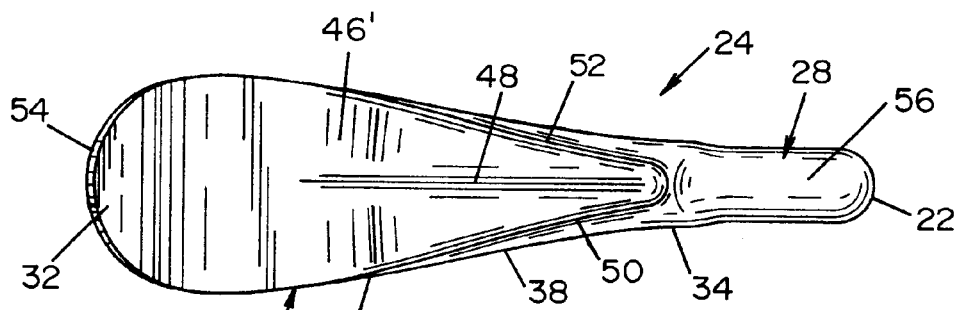
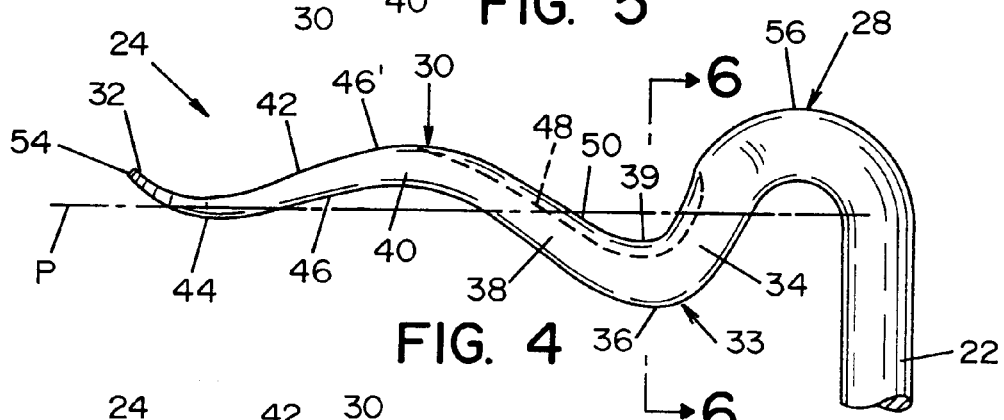
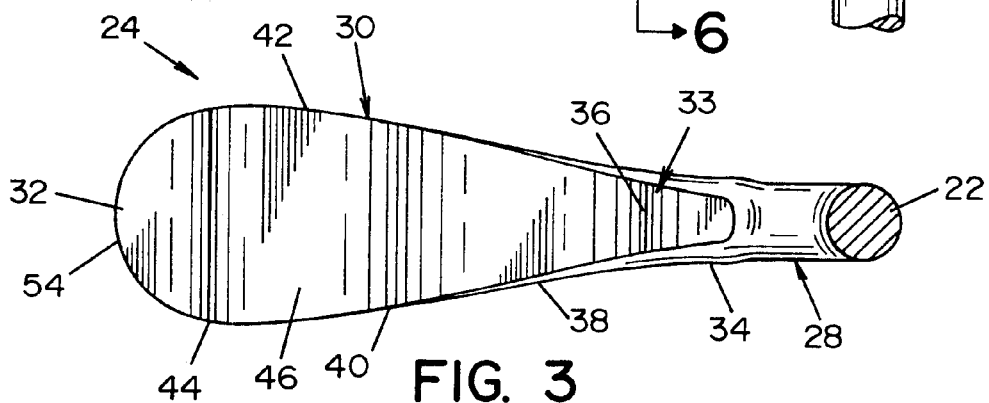
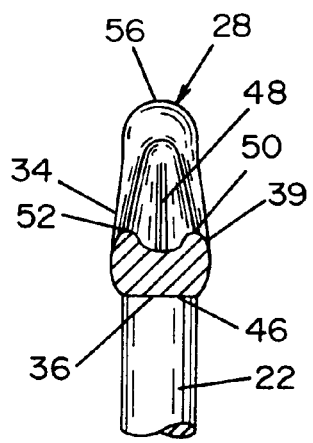

TIRE WORKING TOOL

TECHNICAL FIELD

The present invention generally relates to a tool used for working a tire from the rim of a wheel, and more particularly, to such a tool having a first working end that is used to demount a first tire bead from a wheel rim and a second working end used to demount a second tire bead from the wheel rim.

BACKGROUND ART

From time to time, pneumatic tires require repair or replacement. To service such tires, the tire must be removed from the wheel rim. A variety of tools have been developed and utilized to facilitate the working of tires. Such tools typically comprise an elongate bar having a handle and a working end adapted to be inserted between the tire bead and wheel rim. The working end of the tool frequently has a flattened or tapered portion to facilitate insertion of the working end between the tire bead and the wheel rim. The working ends of known tools are configured, in profile, as either straight, curved, or angled.

To utilize the implement, the tool working portion is inserted manually between the bead of the tire and its associate wheel rim. Thereafter, the user applies pressure on the handle and moves a portion of the working end into contact with the wheel rim, whereby establishing the wheel rim as a fulcrum and making a lever of the tool. Pressure upon the handle causes the tool working end to engage and move a segment of the tire bead inward and allows the tire bead to be stretched over the rim by moving the tool around the periphery of the tire. In more recent years, machines have been developed which rotate the tire in conjunction with the use of the tool to alleviate the need for moving the tool.

While the prior art is replete with working tools, the basic design has not changed significantly over the years. Known designs, while working well to an extent, have proven less than satisfactory in providing an optimally functional tire working implement. Some known devices remove tubeless truck tires by using separate tools for each tire bead. A first working tool is used to stretch the first bead of the tire over the rim. Then, a second working tool is inserted between the second tire bead and the wheel rim and leverages the second bead over the rim to complete removal of the tire. Use of separate implements, however, increases cost and complicates the procedure.

To aid in the removal process, some designs incorporate a projection that extends from the bottom of the flattened portion to create additional leverage when engaged with the wheel rim. Projections, however, carry a disadvantage in that they contact the wheel rim at a single point. Other devices use rollers as the pivot point between the tool and wheel rim. Rollers are undesirable in use because they are prone to movement during the working process and such movement can reduce the mechanical advantage provided by the tool. Still other designs use a bend in the mounting tool working end to create a pivot point. A bend is advantageous to an extent but, as with a projection, it provides only a single point of contact with the wheel rim. With only one point of contact, the tool is prone to rocking or slipping on the rim during the tire removal procedure. Rocking or slipping can dislodge the working tool and require the user to begin the working process anew. At best, rocking or slipping necessarily causes the user to exert additional effort and concentration to maintain the working tool in its proper position.

An additional disadvantage attends the use of conventional working tools. During the working process, the first tire bead is typically removed first by laying the tire flat on the ground or other supporting surface and inserting the working tool between the first bead and the rim. The tool is then used as a lever to work the first bead over the rim. After the first bead is removed from its position on the rim, the tire is then lifted to enable insertion of the second bead working tool between the second bead and the rim. Thereafter, the tire is dropped and acts under force of gravity to free the second bead. As can be appreciated, this repeated manual elevation of tires requires a significant amount of exertion by the user and may be impractical for less powerful users of the tool.

Other known second working tool designs comprise a straight tool having a tip that angles downwardly from the longitudinal plane of the tool. While a downward bend creates a more efficient lever, the downwardly turned tip, however, makes insertion difficult and requires inserting the tip at a sideways angle to the bead. A user will typically insert the tip between the tire bead and the wheel rim, leading with a corner of the tip, and gradually working the remainder of the tip underneath. This process is time consuming, and requires significant effort. A further disadvantage is that, once inserted, the straight portion of the tool presses against the sidewall and tread of the tire in the course of leveraging the tire bead. Since only the bead must be raised outside of the rim, the force exerted against the sidewall and tread does not directly contribute toward a removal of the bead. The flexible sidewall, in fact, absorbs a significant amount of force through deformation before useful force is transmitted to the bead. Thus, more force is required to operate such tools and represents, again, an ergonomic disadvantage to the user. Moreover, by impinging against and applying a significant leveraging force against the sidewall of the tire, conventional tools can cause damage to the tire sidewall and tread areas.

As a consequence, there is a need for a working tool that reduces the likelihood of rocking or sliding of the tool during tire removal. There is a further need for a working tool that is more easily inserted between the bead and the rim. There is a further need for a working tool that does not rest against the sidewall while leveraging the second tire bead from the wheel rim. There is a further need for a working tool that does not require that the tire be lifted by the user in order to removes the second tire bead from the wheel rim.

SUMMARY OF THE INVENTION

It is, therefore, an object of the present invention to provide a working tool that reduces the likelihood that the tool working end will rock or move during the removal of the tire.

It is a further object of the present invention to provide a working tool that creates more than one point of contact between the working tool and the rim.

It is a further object of the present invention to provide a working tool having a heel portion and ball portion that provide simultaneous contact with the wheel rim during tire removal.

It is a further object of the present invention to provide a working tool having a configuration that establishes and maintains positive contact with the rim to reduce the likelihood of lateral rocking of the tool.

It is another object of the present invention to provide a working tool having a working end capable of removing the second tire bead without necessitating an elevation of the tire.

It is a further object of the present invention to provide a working tool having a working end having a reach sufficient to extend beyond the previously removed first bead to demount the second bead from the rim.

It is a further object of the present invention to provide a second bead working tool that is more easily inserted between the second bead and the wheel rim.

It is a further object of the present invention to provide a working tool having a tapered tip that is more easily inserted between a tire bead and the wheel rim.

It is a further object of the present invention to provide a second bead working tool that does not impinge against the sidewall during tire removal.

It is a further object of the present invention to provide a second bead working tool having a working end that is offset from the handle.

In view of these objects the present invention generally provides a tire demounting tool comprising a handle and first and second working ends extending radially outward from opposite handle ends. The first working end includes a heel portion and a lever arm radially extending outward therefrom. The lever arm comprises a rearwardly directed first segment and a forwardly directed second segment connecting to the first segment at a bend portion and defining with the first segment a forward opening crook. A tip portion connects to the second arm segment and is positioned at a remote end of the lever arm. A forwardly projecting ball portion is carried by the lever arm and is positioned proximate the bend portion. A pair of spaced apart ridges are formed to extend along a portion of the lever arm surface defining the crook and provides added stability against a wheel rim during deployment of the tool. The lever arm narrows and tapers across the tip portion to a leading edge to facilitate an easy insertion of the tip between a first tire bead and a wheel rim. The second working end of the tool, in a first embodiment, is configured similarly. The second lever arm comprises a rearwardly extending first segment and a second segment connecting to the first segment at a bend portion. The first and second segments define a forward facing crook at least partially defined by spaced apart ridge projections. The second lever arm segment is elongated to reach across the first tire bead and reach the second bead, and terminates at a tapered tip.

The above and other objectives are achieved by a preferred embodiment that is described in detail below and illustrated in the accompanying drawings.

BRIEF DESCRIPTION OF THE DRAWINGS

FIG. 1 is a front elevational view of a tire demounting tool according to the present invention.

FIG. 2 is a right side elevational view thereof.

FIG. 3 is a sectional view taken substantially along line 3—3 in FIG. 1 showing in detail a first working tool according to the present invention.

FIG. 4 is an enlarged front elevational view of the first working tool according to the present invention.

FIG. 5 is a top plan view of the first working tool.

FIG. 6 is a sectional view thereof taken substantially along line 6—6 in FIG. 4.

DETAILED DESCRIPTION OF THE INVENTION

Figure 17:
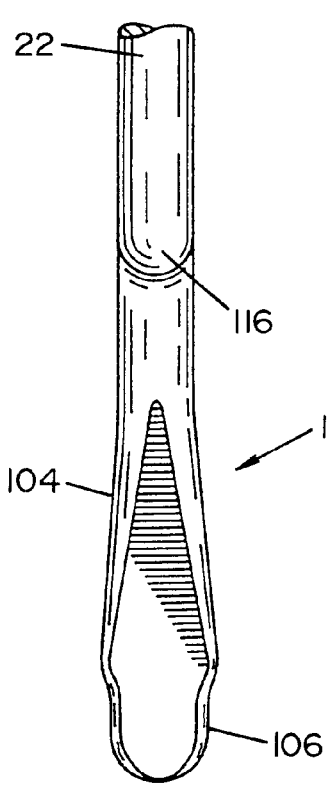
FIG. 17 is a left side elevational view thereof.

As shown in FIGS. 11, 12, and 17, a tire 10 may be mounted to a wheel rim 12 by a first bead 14 and a second bead 16. First bead 14 and second bead 16 radially contact an outer surface 18 of rim 12 and are laterally constrained by flanges 19 of rim 12. To remove tire 10, the first bead 14 and the second bead 16 are stretched over flanges 19 by a working tool.

A working tool according to the present invention is generally referred to by the numeral 20 in the accompanying figures. Working tool 20 generally includes a handle 22, a first working end 24, and a second working end 26. First working end 24 and second end 26 are functional in removing first bead 14 and second bead 16, respectively. As shown in FIG. 1, first and second working ends 24, 26 represent opposite ends of a single handle 22. However, it will be readily appreciated that, alternatively, first and second working ends 24, 26 may be incorporated into separate tools, each having its own handle.

The handle 22 in the preferred embodiment is depicted as being of generally circular cross-section and having a substantially straight body midsection. However, the invention is not intended to be so restricted. Alternative handles may be asymmetrical in cross-section or incorporate alternate longitudinal or sectional shapes. According, as used herein the term "radial" or "radially" shall mean a direction transverse to the longitudinal axis of the tool without any intended implication that the tool is necessarily of circular cross-section. Similarly, the terms "axial" or "axially" shall mean a direction generally along the longitudinal axis of the tool without any intended implication that the tool is straight throughout the length of the handle. Other alternative handles may have geometric irregularities along their respective lengths without departing from the teachings of the invention.

With reference to FIGS. 1–4, first working end 24 generally includes a heel 28; a body portion 30 extending outward from heel 28; and a tip 32 at the remote end of body portion 30. Heel 28, body portion 30, and tip 32 extend generally radially outward from handle 22 substantially along a first plane P as shown in FIG. 4. First end 24 includes a bend portion 33 depending below plane P and positioned between tip 32 and heel 28, preferably proximate to heel 28. It should be understood that bend portion 33 is carried on body portion 30 and formed in any known manner. Bend portion 33 may be formed having alternative shapes without departing from a the invention provided that such alternative shapes provide the capability of impeding the first tire bead 14 from sliding along the body 30 and toward the heel 28 during the removal procedure, as will be described below. In the embodiment shown, bend portion 33 is generally wedge-shaped having a first segment 34 extending outward and downward from heel 28 and terminating at a peak 36, which may be rounded over. From peak 36 a second segment 38 of bend portion 33 extends outward and upward and defines an upwardly opening, generally triangular, cavity or crook 39 between first and second segments 34, 38. Second segment 38 terminates at a ball portion 40 of the body portion 30. Ball portion 40 may be formed in the same manner as bend portion 33 and comprises a surface extending outward and above plane P. As shown ball portion 40 is configured as a shallow curved segment of body portion 30. From the ball portion 40 a third segment 42 extends radially outward and downward to a knuckle 44. Tip 32 extends radially outward and upward from knuckle 44 and represent the terminal end of the body 30.

As can be appreciated, first working end 24 comprises a plurality of separate segments described above formed, in the preferred embodiment, as an integral unit. Alternatively, the first peak 36, ball 40, and knuckle 44 may be formed as independent projections carried by the body portion 30. For example, peak 36, ball 40 or knuckle 44 may be attached to a generally flat body portion 30 and represent projections from the general plane of body portion 30. Similarly, heel 28 may be flat, i.e. extending generally perpendicular to handle 24 or it may extend at an angle outward from handle 22. As shown, heel 28 is curved and extends generally along a line perpendicular to handle 24.

With further reference to FIG. 4, the first working end 24 may taper from heel 28 to tip 32. As best shown in FIG. 3, lower surface 46 may be smooth. As shown in FIG. 5, a creased upper surface 46' may be used. Creased upper surface 46' has a generally centrally located crease 48 that extends along the longitudinal axis of body 30 and defines a pair of lateral ridges 50, 52. Crease 48 extends from first segment 34 to ball portion 40, leaving the tip 32 uncreased. Tip 32 may include a rounded front edge 54. While rounded in the preferred embodiment, it should be understood that edge 54 of tip 32 may be a plurality of alternative conventional shapes.

As best shown in FIG. 4, ball 40 extends upward to substantially the same extent as an upward crown 56 of heel 28. That is, the outermost surface of heel and ball 40 are substantially coplanar. Alternatively, the ball 40 may extend outward to a lesser extent than heel 28 as represented in FIG. 4. In addition, tip 32 extends outward to a lesser extent than ball 40. When considering such an alignment, a line connecting tip 32, ball 40, and heel 28 would be disposed somewhat at an angle less than perpendicular to handle 24. Angular disposition of these components is intended to ease insertion of first working end 24 between the first tire bead 14 and the wheel rim 12.

Figure 11A:
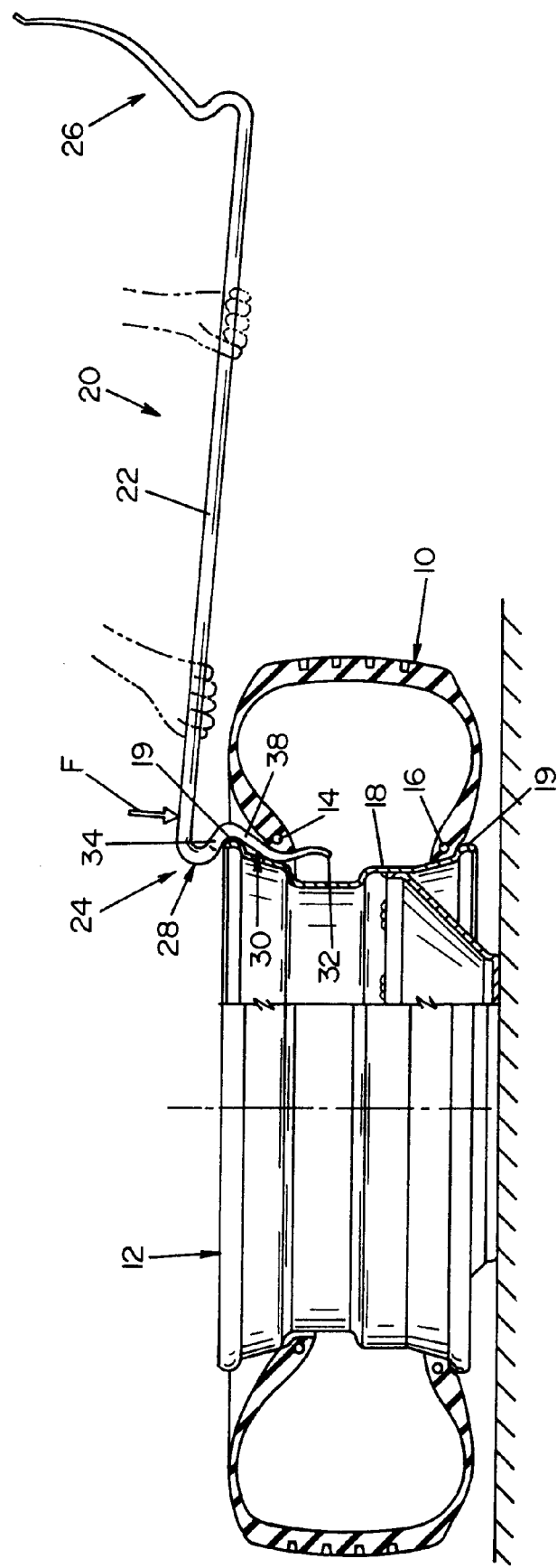
FIG. 11A is a partially schematic partially sectional and fragmented view of a tire mounted on a rim show in insertion of the first working tool.

As best shown in FIG. 11A, the first working end 24 is used to remove the first tire bead 14. First working end 24 is sintered downwardly between rim 12 and first bead 14, in the direction of the arrow F, until the first segment 34 contacts the rim 12. Tip 32 is the first portion of first working end 24 to contact bead 14. Since tip 32 is angled outward, it conforms generally to the peripheral contour of flange 19. Such conformance allows the tip 32 to readily slip between the rim 12 and first bead 14 without inflicting damage to the tire. As tip 32 is inserted, the angled lower surface thereof forces the first bead 14 outward from rim 12.

Figure 11B:
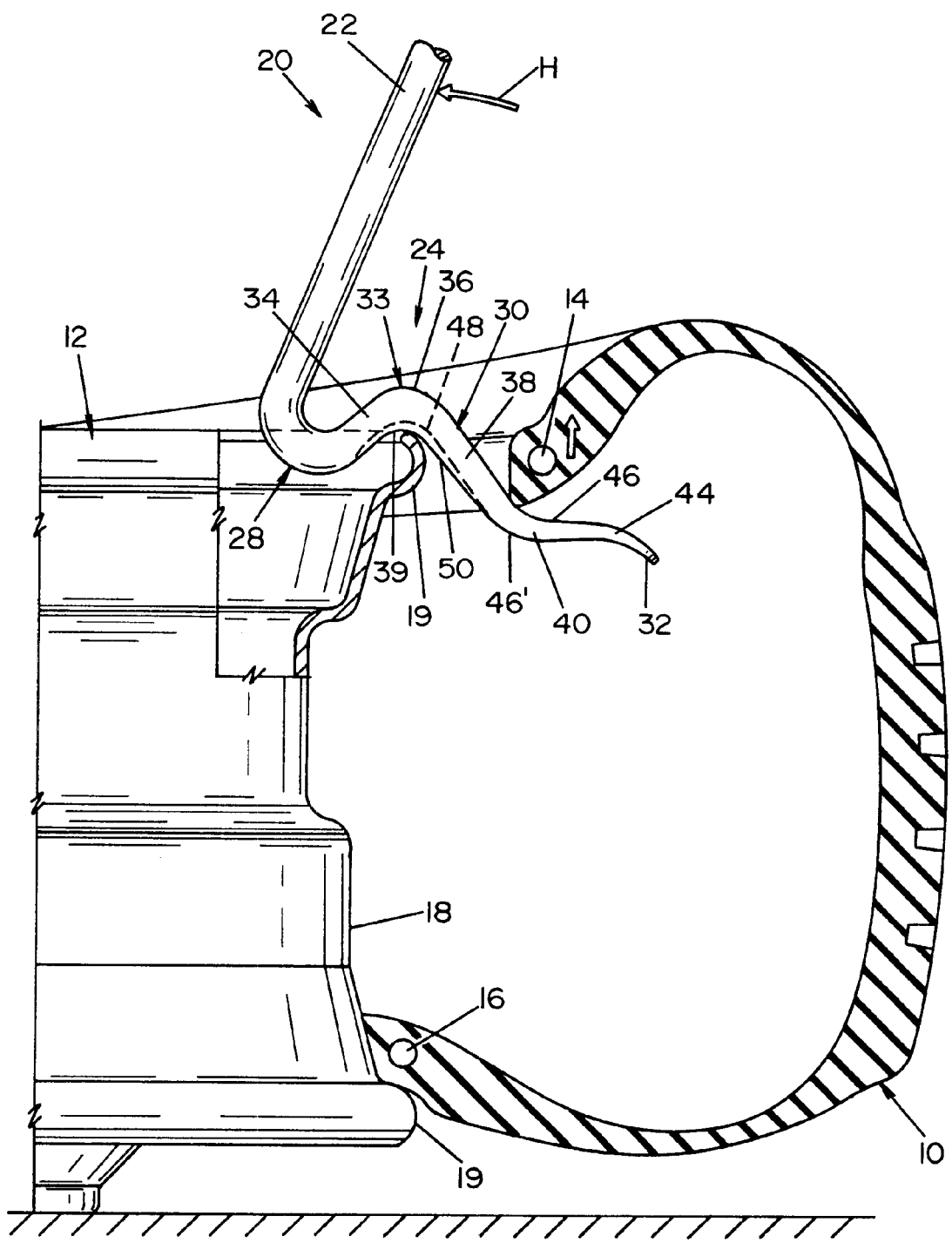
FIG. 11B is a fragmented partially sectional side elevational view of the tire, rim, and first working tool showing removal of the first bead.

Once the tip 32 is fully inserted, FIG. 11B, the user rotates handle 22 in the direction of arrow H. The first working end 24 contacts the rim 12 and establishes the flange 19 as a working fulcrum. As shown in FIG. 11B, crook 39 of middle portion 30 effectively traps flange 19 between first segment 34 and second segment 38. As the tool working end 24 is rotated, upper surface 46' contacts the flange 19 where the ridges 50, 52 of the creased surface 46' form two points of contact against flange 19. As can be appreciated, the two point contact established between the ridges 50,52 and flange 19 helps prevent the first tool end 24 from rocking laterally and serves to stabilize the application of leverage.

As the handle 22 continues to rotate, the first working end 24 lifts the first bead 14 over the rim 12. As illustrated in FIG. 11B, the first bead 14 is stretched outward from rim 12 away from its natural at-rest position. So stretched, induced forces within the first bead 14 act to attempt a return of the first bead to its natural position. Thwarted from a return to an inward position by the working end 24, the first bead 14 tends to move upward along the second segment 38 toward rim 12. Raised portion 33, however, interferes with such movement and impedes the first bead 14 from moving inward until the first bead 14 is lifted over the flange 19.

Figure 11C:
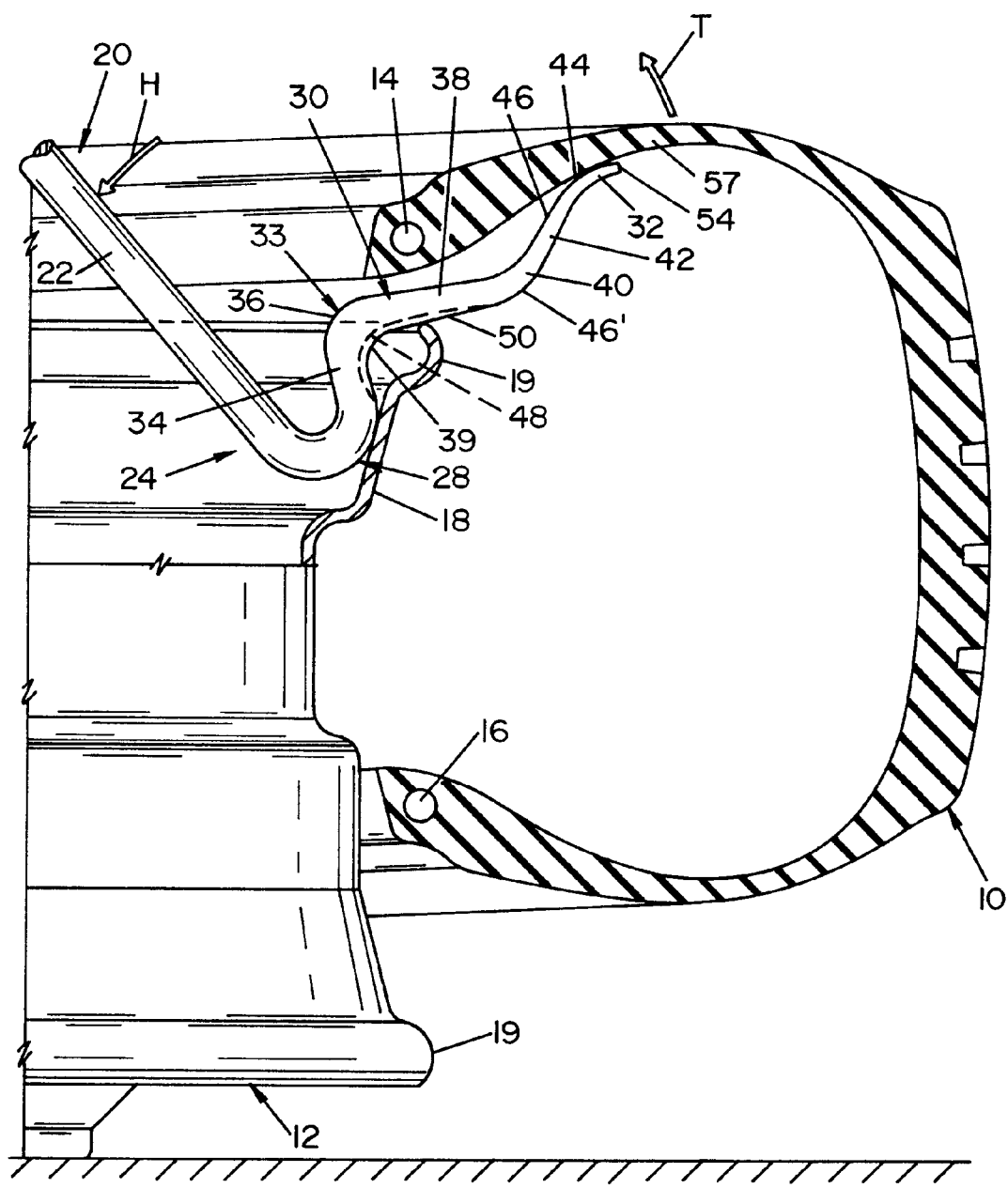
FIG. 11C is a fragmented partially sectional side elevational view of the rim, tire, and first working tool showing removal of the first bead of the tire.

As the first working end 24 continues to rotate in direction H, FIG. 11C, the wedge-like bend portion 33 assumes a position placing the second segment 38 generally parallel to the upper surface of the rim 12. So positioned, the first bead 14 is no longer contained by bend portion 33 and expands inward to a position over the rim 12. As can be appreciated, the amount of resistance to such inward expansion exerted by end portion 33 decreases with progressive rotation of the tool 20. Immediately prior to a release of the first bead 14, heel 28 contacts the rim 12. As shown in FIG. 11C, the heel 28 and the middle portion of body 30 create two points of contact against the rim 12 and serve to thereby stabilize the working tool 24 as the first bead 14 moves inward. As shown, tip 32 contacts the sidewall 57 of tire 12 and levers the tire 12 upward, as shown by arrow T.

Once the first bead 14 is removed, the tire 12 is demounted completely by removing second bead 16. To that end, the second working end 26 is utilized. As previously discussed, second working end 26 may be mounted on a separate tool, or, as shown in FIG. 1, integrated on the same handle 22 as first working end 24. If mounted on a single handle 22, first and second ends 24, 26 may be in any radial position relative to each other including a diametrically opposed relative position. If the tool ends 24, 26 are opposed; the user may use the end that is not in use as a hand hold. As can be understood, the radially extending end opposite to the inserted end, in addition to providing a hand hold, also provides additional leverage.

Figure 7:
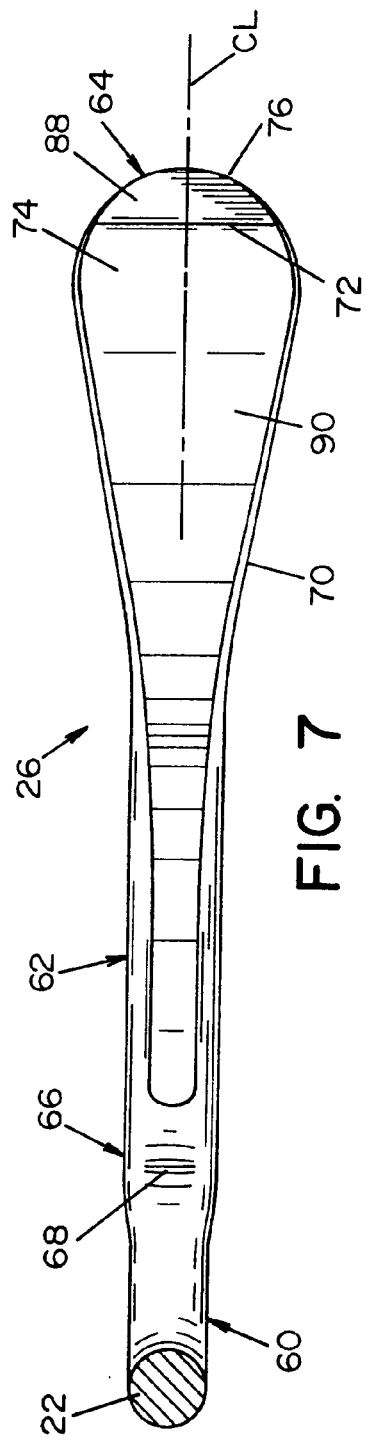
FIG. 7 is a sectional view taken substantially along line 7—7 in FIG. 1 showing a second working tool.
Figure 8:
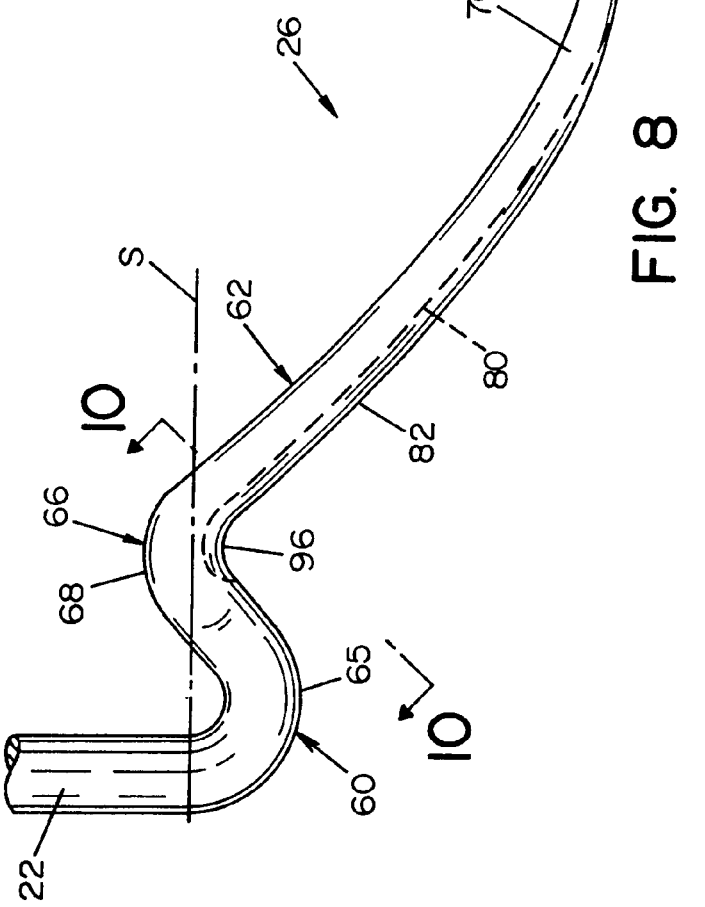
FIG. 8 is an enlarged front elevational view of an alternative embodiment of the second working tool.

Second working end 26 has components similar to first working end 24. As shown in FIGS. 7 and 8, second working end 26 includes a heel 60, a middle portion 62, and a tip 64. Heel 60 extends radially outward from handle 22 at a generally perpendicular relationship. Heel 60 may be of any shape, and as shown may include a rounded outer surface 65. It should be understood that heel 60 may be formed from a plurality of joined segments or, as shown, as a single curved segment.

Middle portion 62, located adjacent to heel 60, includes a raised portion 66 extending axially inward from heel 60. As discussed in regard to raised portion 33 of first end 24, raised portion 66 may be of any shape or number of segments so long as it extends axially inwardly of a second working end plane S. Preferably, raised portion 66 includes a rounded top surface 68.

Figure 12A:
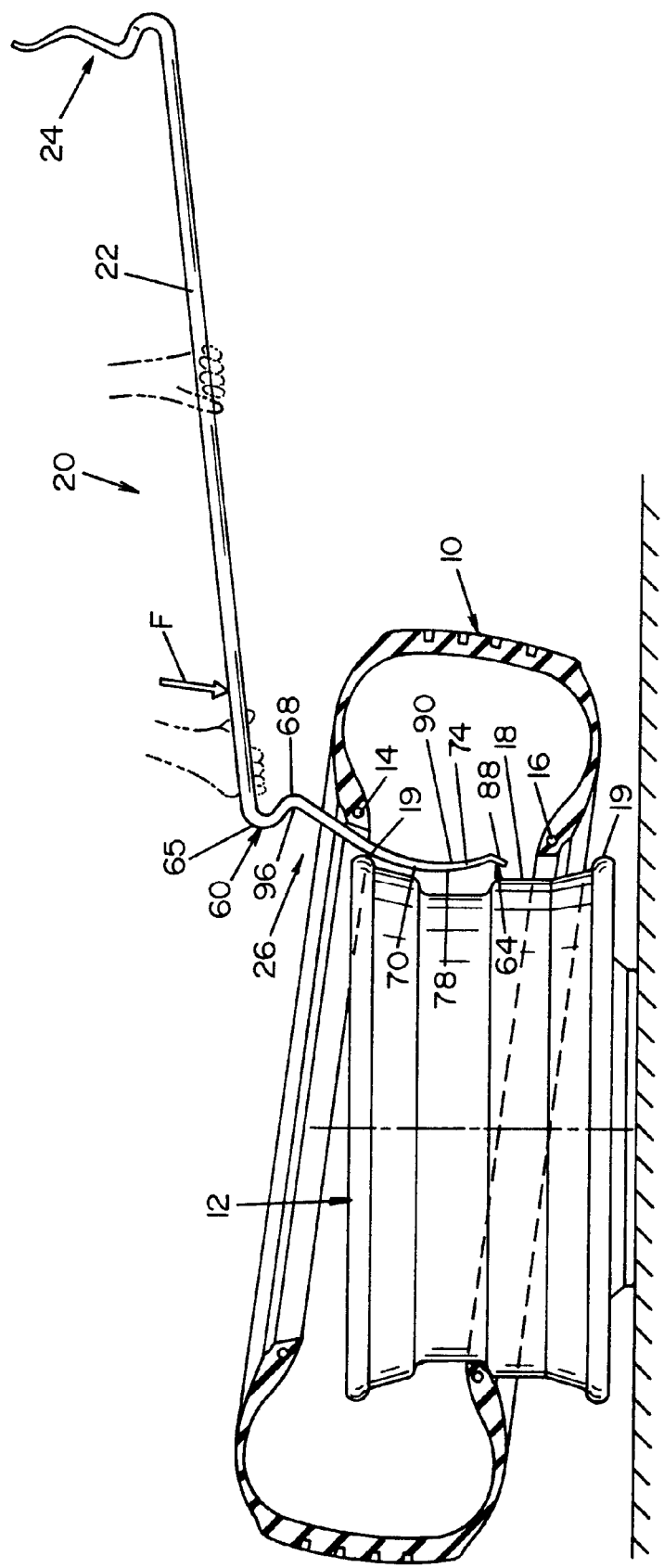
FIG. 12A is a partially schematic side elevational view of the rim and the tire shown in section showing insertion of the second working tool.

An elongated ball portion 70 extends radially and axially outward from raised portion 66. Ball portion 70 extends outward of the second tool end plane S, and may be formed of multiple segments or, as shown, as a single curved segment. Preferably, the ball portion 70 is shaped to substantially conform to the inner surface 18 of the wheel rim 12. As best shown in FIG. 12A, the second working end 26 is inserted downward between the wheel rim flange 19 and the first bead 14 of the tire 10. The ball portion 70, as configured in FIG. 12A, remains close to the rim 12 whereby positioning the tip 64 for insertion between the second bead 16 and the rim 12. Ball portion 70 terminates in a knuckle 72 proximate the tip 64. The tip 64 extends outward and forward from the knuckle 72. The ball portion 70 may generally taper in cross-sectional dimension toward tip 64. Further, as shown in FIG. 7, ball portion 70 may broaden in its width dimension from center line CL forming a flattened bill 74 near tip 64. Moreover, with further reference to FIG. 7, tip 64 may taper inwardly in width from bill 74 toward center line CL, and have a rounded outer edge 76.

Figure 9:
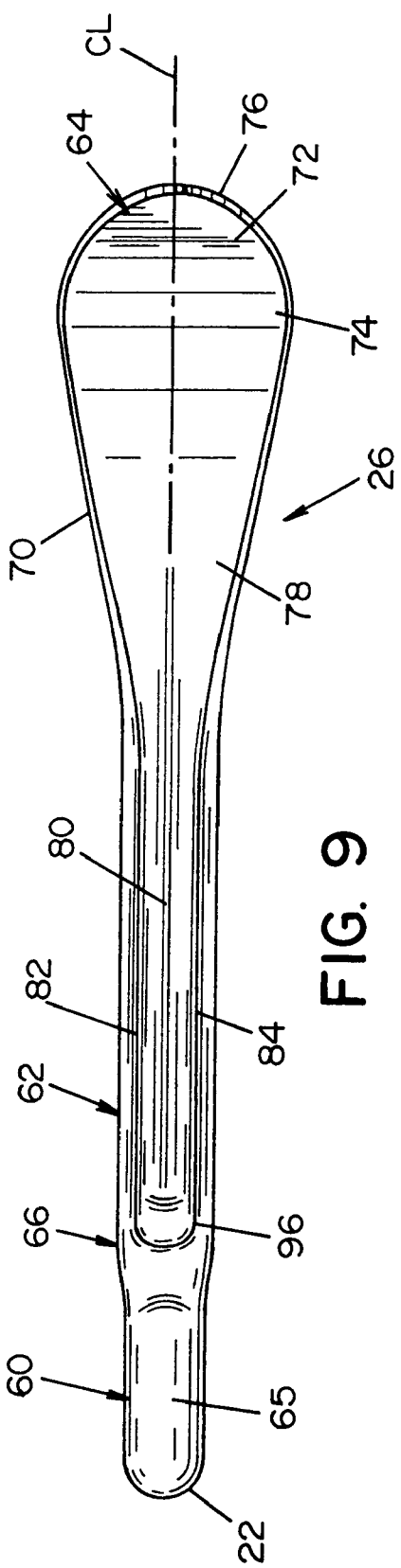
FIG. 9 is a bottom plan view of the second working tool.
Figure 10:
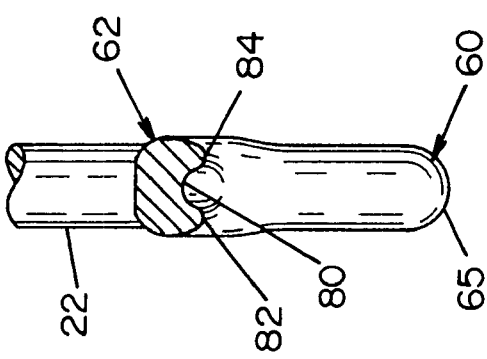
FIG. 10 is a sectional view taken substantially along line 10—10 in FIG. 8.

The lower surface 78 of the second tool end 26 may be creased in a fashion similar to first tool end 24. As best shown in FIG. 9, lower surface 78 has a crease 80 generally located at the center of lower surface 78 and extending from the beginning of ball portion 70 to raised portion 66, and may partially extend into bill 74. As shown in FIG. 10, crease 80 defines ridges 82, 84, which stabilize the second working end 26 in a similar fashion to the ridges 50, 52 of first tool end 24.

With reference to FIGS. 12A–12D, second working end 26 is used to demount the second tire bead 16. As shown in FIG. 12A second working end 26 is inserted past first bead 14, and the tip 64 feels its way along the inner surface 18 of rim 12. To insert the second working end 26, the user forces the tool end downwardly in the direction of arrow F. The user inserts second tool end 26 by pressing down on handle 22 to cause the tip 64 to move downwardly past first bead 14. The ball 70 closely conforms to inner surface 18 of rim 12 holding tip 64 near to inner surface 18 and positioning tip 64 for its insertion between second bead 16 and rim 12. The angled outer surface 88 of tip 64 facilitates insertion between second bead 16 and rim 12. Engagement between the surface 88 and the second bead 16 pushes second bead 16 radially outward from the rim 12 as the tip 64 passes.

Figure 12B:
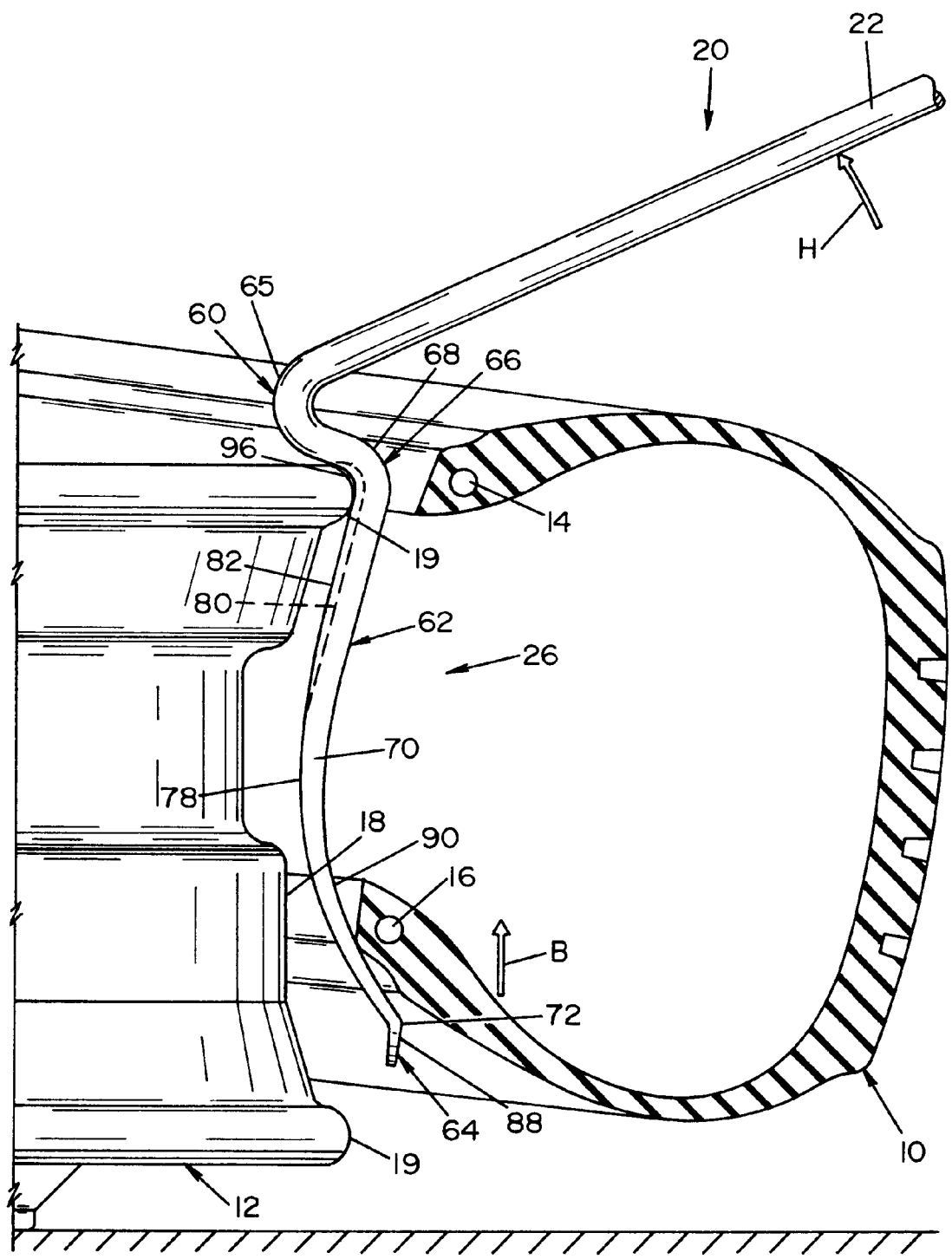
FIG. 12B is an enlarged side elevational view with the tire in section and a portion of the second working tool broken away showing the second working tool fully inserted.

Once fully inserted, FIG. 12B, second bead 16 moves radially inward along the upper surface 90 of bill 74. Subsequent rotation of the handle 22 in the direction of arrow H causes the second bead 16 to be lifted in the direction of arrow B. Since second bead 16 has moved inwardly of tip 64 second bead 16 is effectively trapped between knuckle 72 and raised portion 66. So captured, the second bead 16 is prevented from traveling outward over tip 64. As can be appreciated, a tool end having a middle portion 62 and tip 64 linearly configured or angled in an outward direction would, contrary to the present invention, allow second bead 16 to slide outward as the tool is rotated. Such movement could allow the second bead 16 to slip over tip 64 forcing the user to restart the second bead demounting process.

Figure 12C:
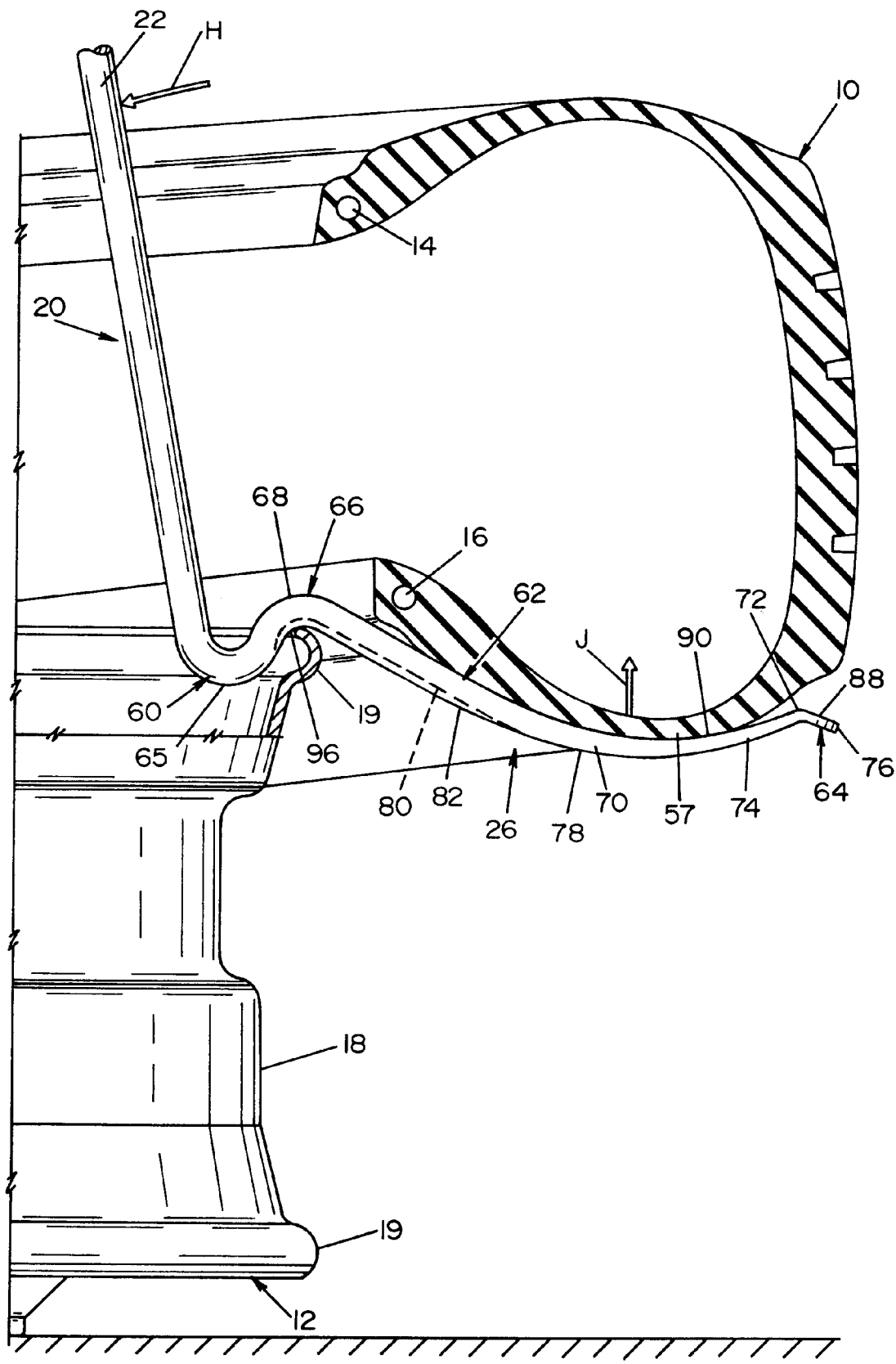
FIG. 12C is an enlarged side elevational view of the rim, tire, and second working tool with the tire shown in section and showing the removal of the second bead of the tire by the second working tool.

As the user continues to rotate handle 22 in the direction of arrow H, FIG. 12C, the clearance provided by the axially outwardly extending ball 70 allows the tire sidewall to rest on the upper surface of ball 70. As shown, a curved upper surface 90 beneficially cups the sidewall and distributes the upward force applied by the tool along substantially the entire sidewall. In the position shown in FIG. 12C, the second tool end 26 lifts the tire 10 upward in direction J over rim flange 19. The crook 96 defined by raised portion 66 rests on rim flange 19, and the creased lower surface ridges 82, 84 contact rim flange 19 along two spaced apart points of contact. As discussed with respect to first tool end 24, the ridges 82, 84 reduce lateral rocking of the second working end 26 during the leveraging procedure and facilitate a more efficient application of leveraging force.

Figure 12D:
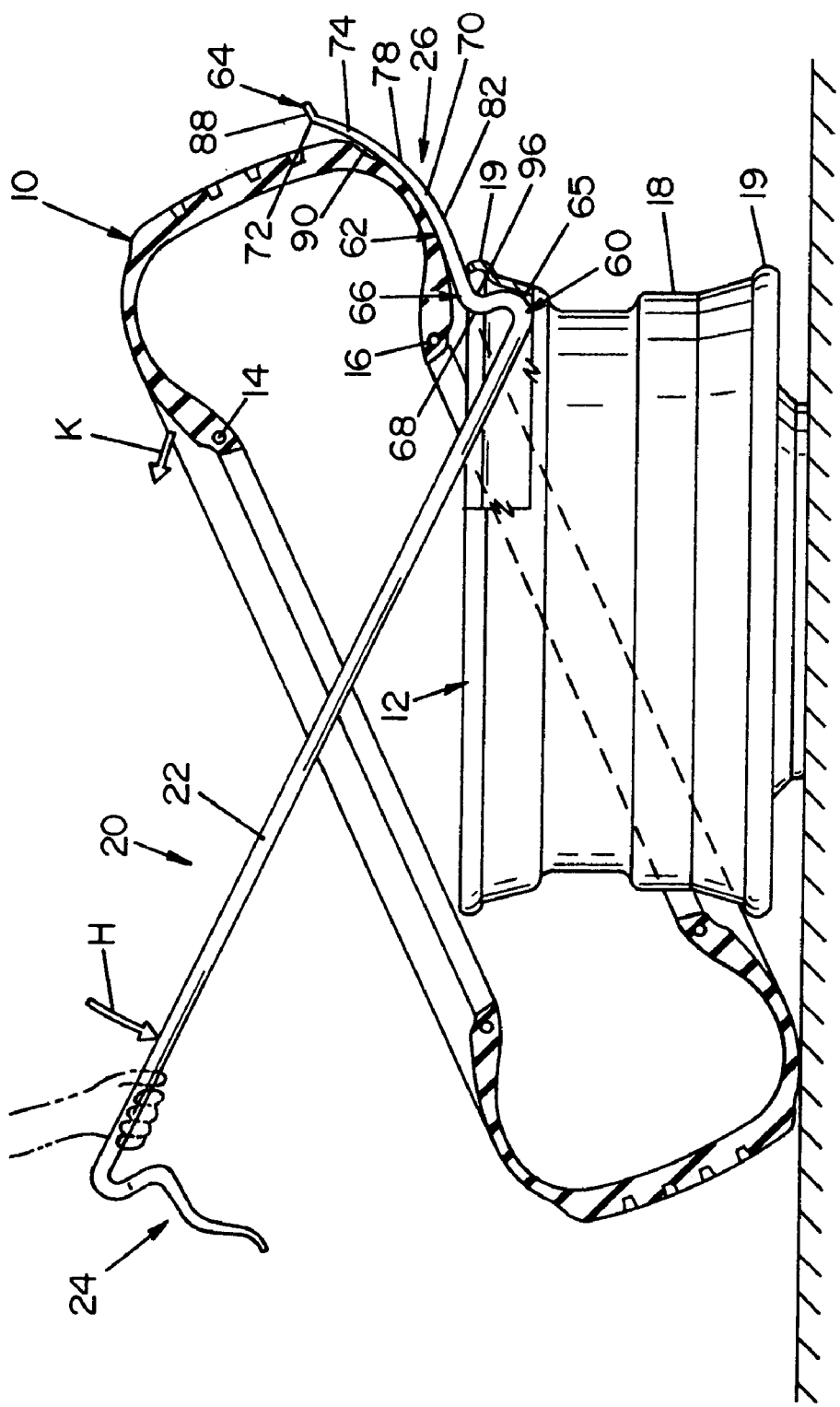
FIG. 12D is a partially schematic side elevational view of the rim, tire, and second working tool showing the second bead of the tire removed from the rim by the second working tool.
Figure 14:
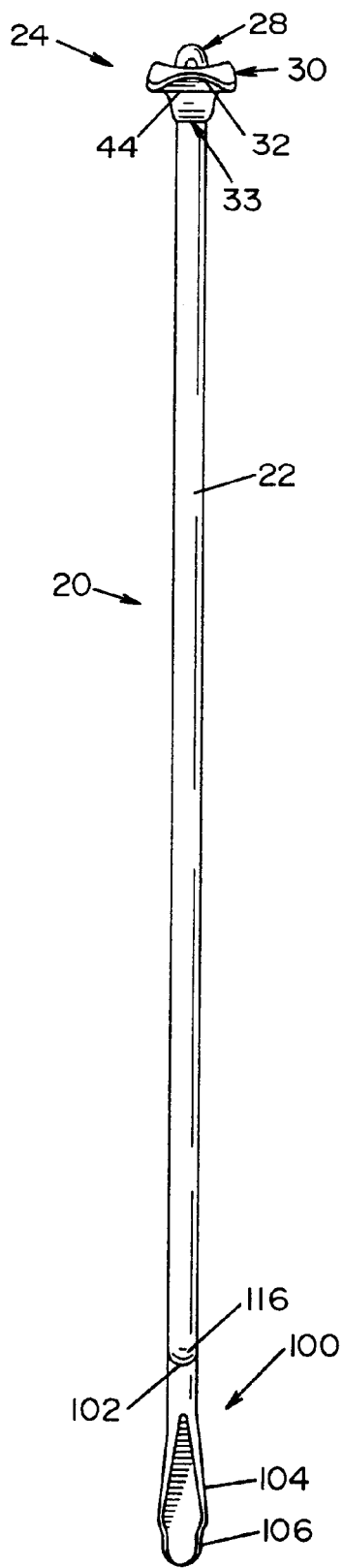
FIG. 14 is a left side elevational view thereof.

As the tire 10 reaches the complete removal point, FIG. 12D, both the heel 60 and the middle portion 62 contact rim 12 to provide a stable platform by which to finish the removal of tire 10 in direction K.

As demonstrated in FIGS. 12A–12D, second working end 26 may be used without elevating tire 10. Obviating the need to lift tire 10 is an advantage to less powerful users of the subject tool. Other users, however, may prefer to follow the more conventional procedure of elevating the tire 10 and using gravity to demount the second bead 16.

Figure 13:
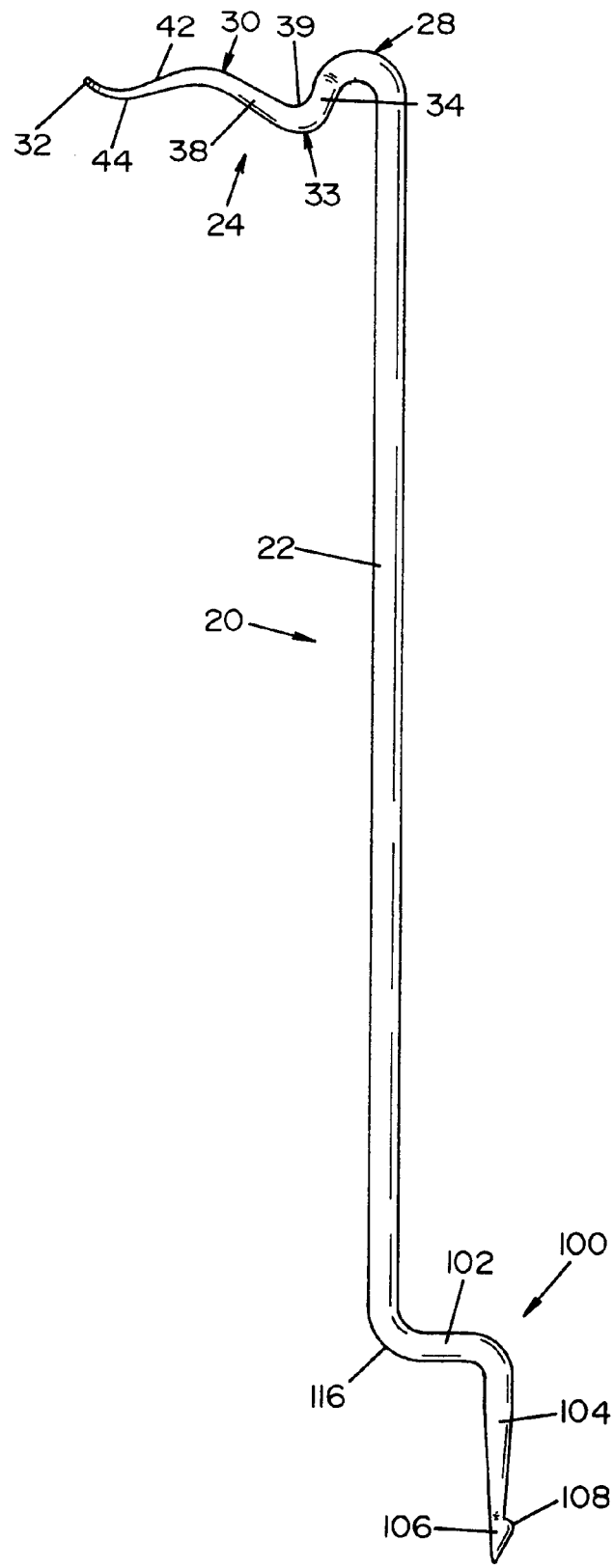
FIG. 13 is a front elevational view of an alternative embodiment of the working tool having an alternative second working tool.

To that end, an alternative second working end 100 is shown in FIGS. 13–17. Alternative working end 100 is offset from handle 22 by a segment 102. Offset segment 102 spaces the alternative second working end 100 from handle 22 and may be angular, curved, or straight, as shown. As shown in FIG. 13, the offset segment may extend perpendicularly from handle 22. When alternative working end 100 and first working end 24 are placed on a single handle 22, the offset segment 102 provides the user with additional leverage when demounting the first bead 14. For example, the user can use alternative working end 100 as a hand hold during working of the first bead 14, and the offset segment 102 acts to increase the effective lever arm between the user's hand and the tip 32.

Figure 15:
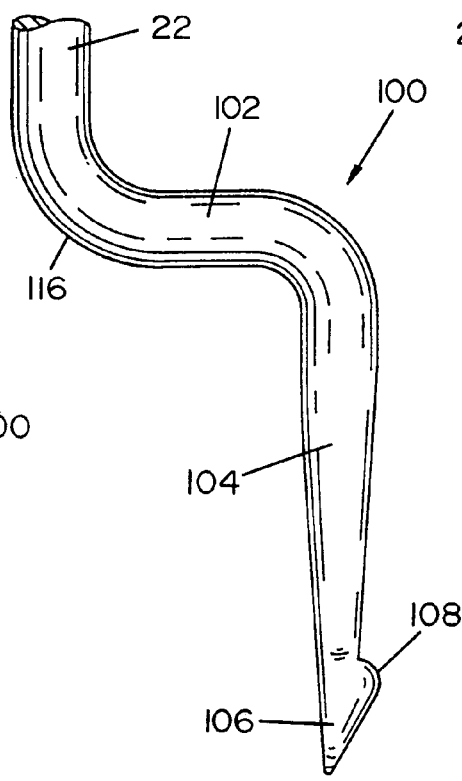
FIG. 15 is an enlarged front elevational view thereof.
Figure 16:
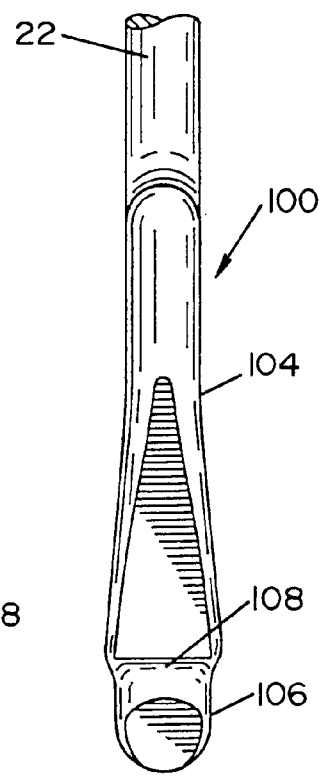
FIG. 16 is a right side elevational view thereof.

Alternative working end 100 generally includes a shaft 104 and a tip 106. Tip 106 may be tapered in cross-section to facilitate its insertion. Further, tip 106 may be provided with a bulge 108 on an underside adjacent to shaft 104. It should be understood that bulge 108 may be of any shape and is used to catch the rim flange 19 of the wheel rim 12 after the tip 106 is fully inserted. As best shown in FIG. 15, shaft 104 may be tapered in the axial, outward direction toward tip 106 and, as shown in FIG. 16, bulge 108 may interrupt the taper of shaft 104 and tip 106.

Figure 17A:
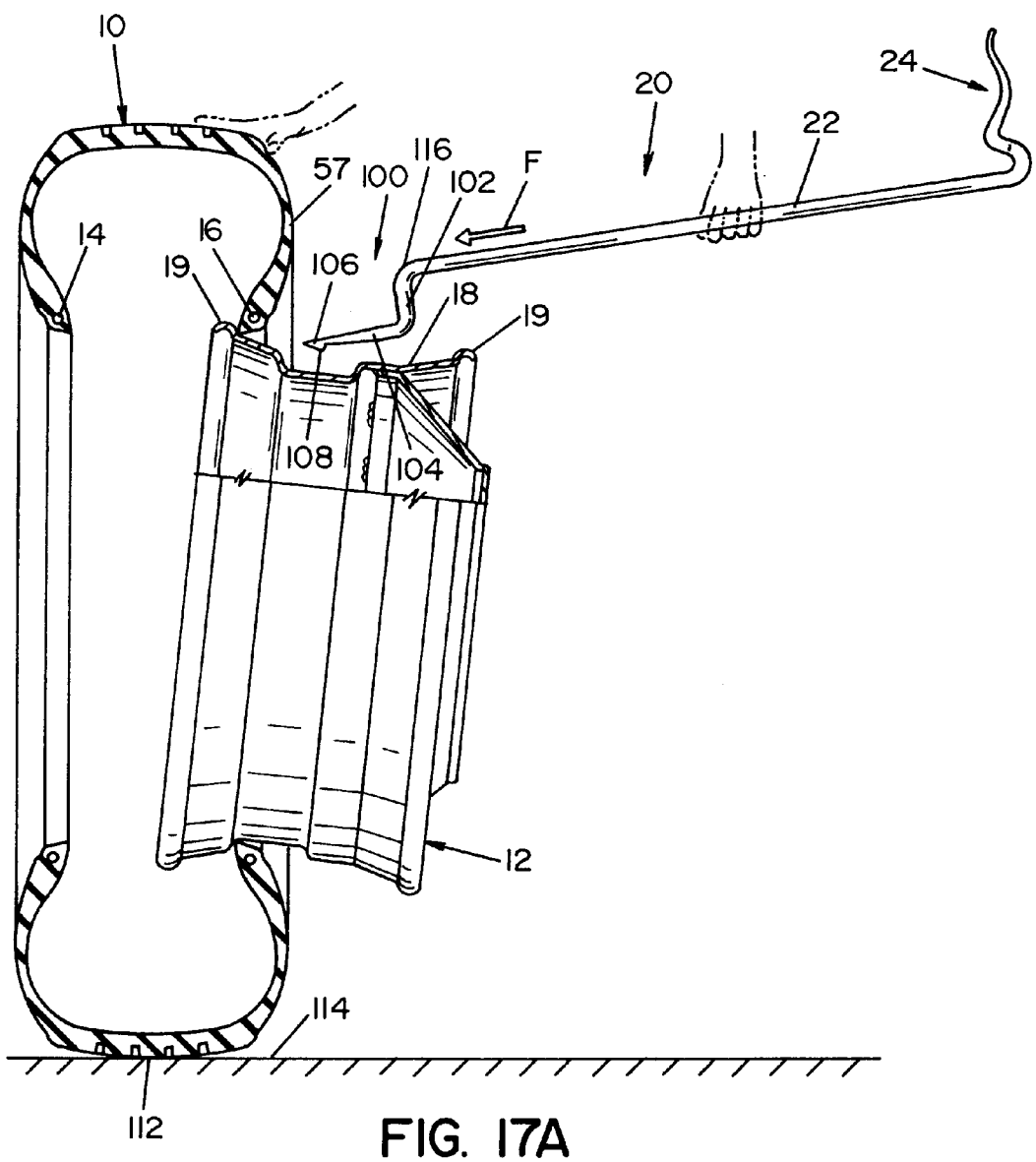
FIG. 17A is a partially schematic, partially fragmented, and partially sectional view of the tire, rim, and alternative second working tool showing the insertion of the alternative second working tool.
Figure 17B:
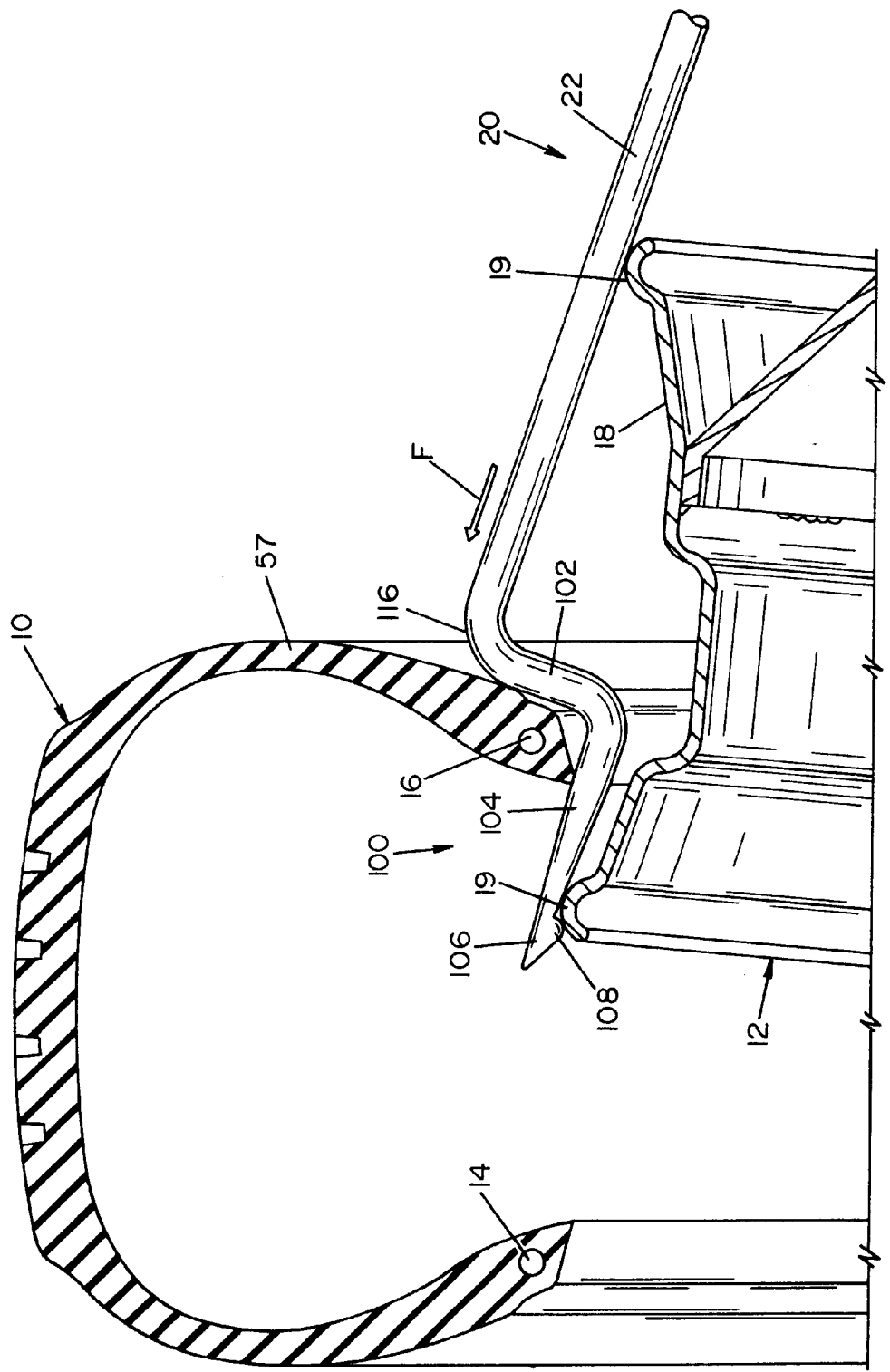
FIG. 17B is an enlarged partially sectional fragmented side elevational view thereof showing the alternative second working tool fully inserted.

FIGS. 17A–17B illustrate the demounting of the second bead 16 of tire 10 using alternative end 100. To demount the second bead 16, the user elevates tire 10 to a generally vertical position, FIG. 17A, creating an area of contact 112 between the supporting surface 114 and the tire 10. So positioned, the rim 12 is suspended by second bead 16. Alternative second working end 100 is inserted between the rim 12 and second bead 16 near the top of rim 12. Offset segment 102 creates a clearance between the sidewall of tire 10 and the wheel rim, easing the insertion of tip 106. Once fully inserted, FIG. 17B, off-set segment 102 abuts sidewall 57, and bulge 108 rests against rim flange 19. Subsequently, the user releases tire 10 to fall in a direction M toward working tool 20.

Figure 17C:
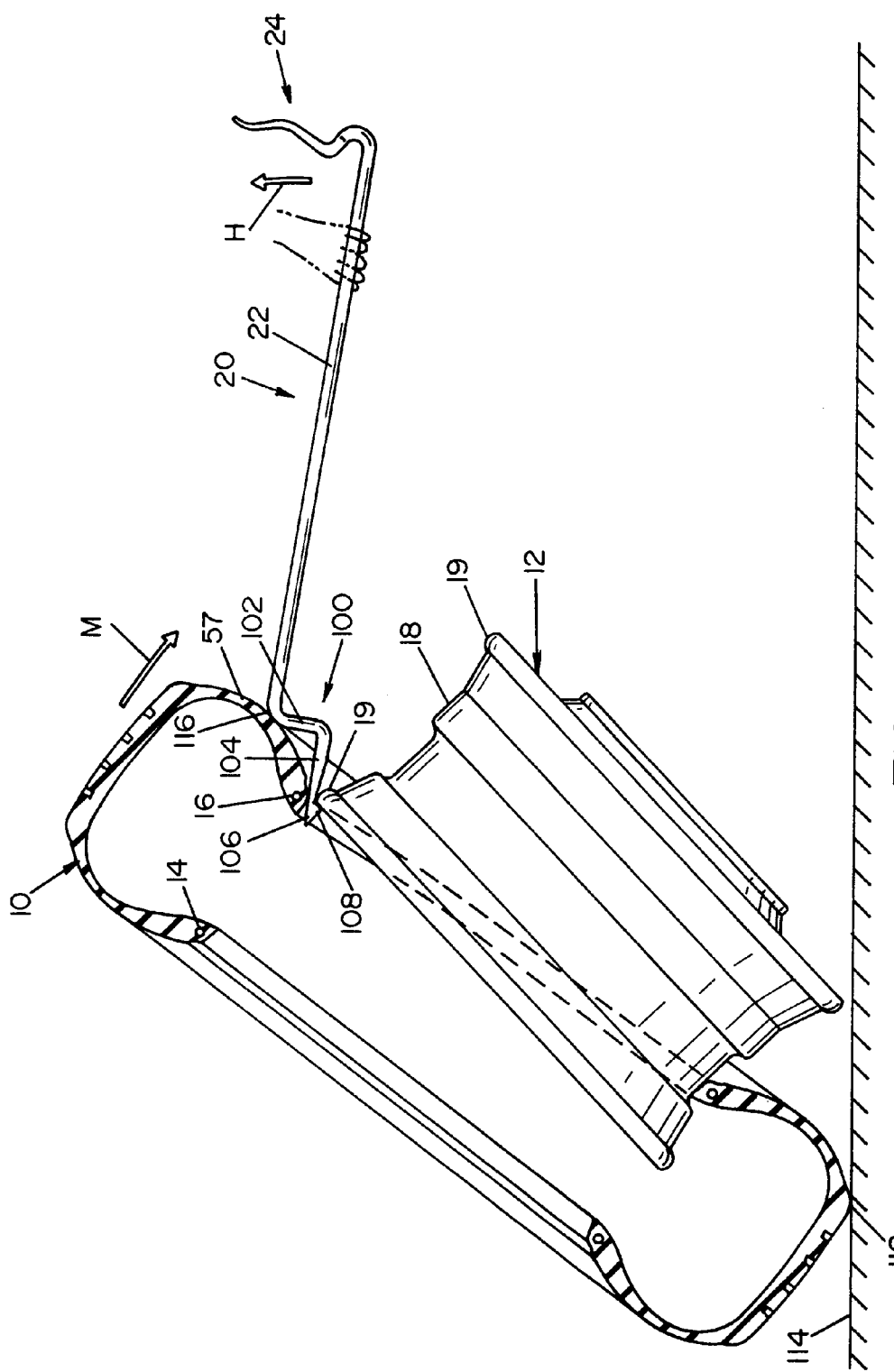
FIG. 17C is a side elevational view of the tire, rim, and the alterative working tool with the tire shown in section showing removal of the second bead using the alternative second working tool.
Figure 17D:
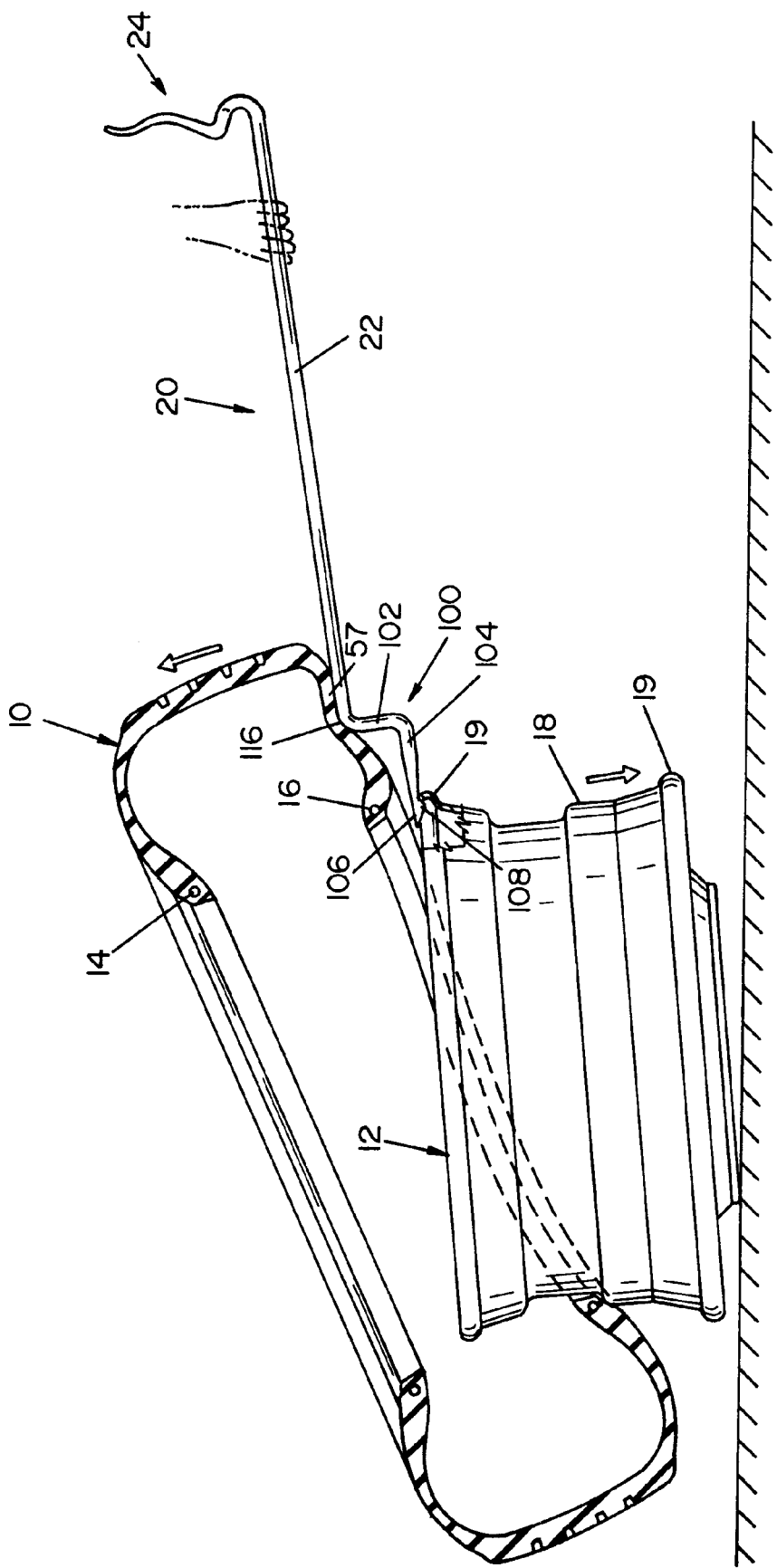
FIG. 17D is a partially sectional fragmented side elevational view of the rim, tire, and the alternative working tool with the tire shown in section, showing the second bead of the tire removed from the rim by the alternative second working end of the tool.

As shown in FIG. 17C, at the point of release, bulge 108 hooks rim flange 19 preventing the alternative tool end 100 from being forced out by the force of the stretched second bead 16. To demount the tire, the user may simply allow the tire to fall while holding the handle 22, or the user may elevate handle 22 somewhat, against the tire's rotation, as shown by arrow H.

At the point of release, the tire 10 and rim 12 initially rotate together about the point of contact 112. At some point during the rotation, the alternative tool end 100 held fixed or rotating opposite to the direction of the tire 10 prevents the continued rotation of the tire 10. The tool end 100 stretches the second bead 16 over rim flange 19 and frees the rim 12 to fall independently. The tire 10 is held by the handle 22 of working tool 20 as the rim 12 falls free.

Focusing on the contact between alternative second working end 100 and second bead 16, the tool end 100 creates a counter force acting against second bead 16 in a direction opposite to the downward motion of the rim 12. In particular, ball 108 contacts flange 19 creating a fulcrum. The shaft 104 and offset 102 rotate about ball 108 respectively stretching second bead 16 away and over rim 12.

As best shown in FIG. 17C, offset 102 prevents the shaft 104 from contacting the tire sidewall 57. Accordingly, substantially all of the force applied along the shaft 104 is focused toward the fulcrum 108 and applied to stretch the second bead 16 away from rim 12. None of the applied force is lost due to induced deflection of the tire sidewall 54. Similarly, any contact between offset 102 and tire 10 is initially focused at the second bead 16, FIG. 17B, and pushes the second bead 16 over rim 12. As can be appreciated, the maximum magnitude of force is generated as the second bead 16 is stretched over rim 12. Avoiding contact between the shaft 104 and the sidewall 57 also reduces the potential for damage to the tire sidewall 57. Once the second bead 16 is disengaged, FIG. 17C, the working end 100 may fall with rim 12. At this point, sidewall 57 may contact offset 102 or handle 22. To further reduce the likelihood to damage sidewall 57, the joint 116 between handle 22 and offset 102 may be rounded.

As shown, alternative tool end 100 may be integrally formed with handle 22, but it should be understood that alternative tool end 100 may be constructed of individual members attached to handle 22 and to each other. As can further be appreciated, working tool 20 may be constructed of a variety of materials, including but not limited to metals, polymeric materials, wood, and ceramics, capable of withstanding the forces generated during the working process. Moreover, due to the differing stresses faced by each component, the individual components, for example handle 22 and tool ends 24, 26, 100, may be made of different respective materials. As shown, working tool 20 is constructed of steel.

It will be appreciated from a comparison of the embodiment of the first working end 24 depicted in FIGS. 4 and 5 with the embodiment of the second working end 26 depicted in FIGS. 7 and 8 that the two embodiments are configured similarly. Both embodiments of the working ends 24, 26 comprise a heel portion (28, 66, respectively) positioned at an end of a handle 22 and a substantially serpentine lever arm extending outward from the heel portion (28, 66). The lever arms are "serpentine" in the sense that they comprise a series of directionally variant segments. The lever arm comprises a first segment projecting rearward from the heel portion to a bend (36, 66, respectively). An outer second arm segment connects to the first segment at the bend portion and defines with the first segment a forward opening crook (39). A tip portion (32, 64) is connected to the second arm segment and projects forward and outward therefrom to a terminal edge.

Each working end 24, 26 shown in FIGS. 4, 5, and 7, 8, respectively, further includes a ball portion in the second arm segment at a position proximate to the tip portion. At least one longitudinal ridge and preferably two spaced-apart ridges 50, 52 are provided for enhancing the stability of the tool during bead removal. The ridges 50, 52 extend along an upper surface of the lever arm along at least a portion of the lever arm defining the crook. Preferably, although not necessarily, the ridges 50, 52 extend continuously from the second arm segment along the bend portion of the lever arm and along a portion of the first arm segment.

The lever arms of the working ends 24, 26 widen toward the tip portions 32, 64 then may narrow along the tip portions to an outer respective terminal edge. The lever arm of the second working end 26 is modified from the lever arm of the first working end 24 by an elongation of the second arm segment toward the tip 64. The elongation enables the tip 64 of the second working end 26 to span the tire and reach the second bead 16. The curvature of the ball portion surface 90 of the lever arm is adapted to conform to the external curvature of a tire for the purpose of demounting the tire second bead as described above.

It should be apparent that the invention as described above satisfies the stated objects among others. It should be understood that the preceding is merely a detailed description of a preferred embodiment of this invention and that various modifications and equivalents can be made without departing from the spirit or scope of the invention. The preceding description, therefore, is not meant to limit the scope of the invention. Rather, the scope of the invention is to be determined by the appended claims and their equivalents:

What is claimed is:

1. A tire demounting tool comprising:
   a handle having a first end and a second end;
   a first working end extending radially outward from said first end of said handle;
   said first working end including a body portion extending radially outward from said handle and comprising segments disposed on opposite sides of an end plane;

the body portion joining the handle at a heel;
a tip extending radially outward from said body portion;
a raised portion carried by said body portion and extending below said end plane; and
wherein said first working end comprises at least one longitudinal ridge extending along a forward directed surface from said crook toward said tip.

2. A tire demounting tool comprising:
a handle having a first end and a second end;
a first working end extending radially outward from said first end of said handle;
said first working end including a body portion extending radially outward from said handle and comprising segments disposed on opposite sides of an end plane;
the body portion joining the handle at a heel;
a tip extending radially outward from said body portion;
a raised portion carried by said body portion and extending below said end plane; and
wherein said first working end comprises a plurality of spaced-apart ridges extending along a forwardly directed surface from said crook toward said tip.

3. A tire demounting tool comprising:
a handle having a first end and a second end;
a first working end extending radially outward from said first end of said handle;
said first working end including a body portion extending radially outward from said handle and comprising segments disposed on opposite sides of an end plane;
the body portion joining the handle at a heel;
a tip extending radially outward from said body portion;
a raised portion carried by said body portion and extending below said end plane; and
a knuckle carried on said first working end extending forward from said first end plane between said body portion and said tip.

4. The tire demounting tool of claim 3, wherein said knuckle includes a first segment extending rearward from said body portion and a second segment extending forward from said first segment to said tip.

5. The tire demounting tool of claim 4, wherein said body portion includes a ball portion adjacent said first segment of said knuckle, said ball extending forward of said first end plane.

6. The tire demounting tool of claim 3, wherein said knuckle extends rearward less than said raised portion relative to said first end plane.

7. A tire demounting tool comprising:
a handle having a first end and a second end;
a working end for removing a second tire bead, the second working end extending generally radially from said second end of said handle and defining a second end plane;
said second working end including a heel extending outward from said shaft; a middle portion extending outward from said heel, said middle portion including an elongated ball portion extending outside said second end plane; a tip extending outward from said ball portion; and a knuckle disposed between said tip and said ball portion; and
a raised portion extending axially rearward from said heel adjacent said ball portion, said raised portion terminating in a peak.

8. The tire demounting tool of claim 7, wherein said first working end and second working end are diametrically opposed.

9. The tire demounting tool of claim 7, wherein said raised portion includes a first segment extending rearward and outward from said heel to a peak, and a second segment extending forward and outward from said peak.

10. The tire demounting tool of claim 9, wherein said peak is substantially flat.

11. The tire demounting tool of claim 7, wherein said second working end has a lower surface, and a plurality of spaced-apart outwardly directed ridges extending along at least a portion of said lower surface between said heel and said ball portion.

12. The tire demounting tool of claim 7, wherein said middle portion tapers toward said knuckle.

13. A tire demounting tool comprising:
a handle having a first end and a second end;
a second working end adjacent said second end of said handle and extending axially therefrom, said second end including a shaft and a tip extending axially of said shaft; said tip having a bulge extending radially outward therefrom; and
an offset member interposed between said shaft and said handle, spacing said second working end radially from said handle.

14. The tire demounting tool of claim 13, wherein said second working end shaft tapers toward said tip.

15. The tire demounting tool of claim 14, wherein said tip tapers to a flattened edge.

16. The tire demounting tool of claim 15, wherein said bulge has a lower surface coaxial with said tip.

17. The tire demounting tool of claim 13, wherein said first and second working ends are diametrically opposed.

18. A tire demounting tool comprising:
a handle;
a first working end extending forwardly from said handle, said first working end comprising:
a heel portion positioned at a forward end of the first working ends;
a lever arm extending radially outward from the heel portion and comprising:
a rearwardly directed first segment connected to said heel portion;
a forwardly directed second segment connected to said first segment at a bend portion and defining with said first segment a forward opening crook;
a tip portion connected to said second segment and positioned at a remote end of said lever arm; and
wherein the second segment further comprises a forwardly projecting ball portion positioned proximate to said bend portion.

19. A tire demounting tool according to claim 18, wherein a forward facing surface of the lever arm includes at least one longitudinal ridge extending along at least a portion of the lever arm defining said crook.

20. A tire demounting tool according to claim 19, wherein the forward-facing surface of the lever arm includes a plurality of spaced-apart longitudinal ridges extending along at least a portion of the lever arm defining said crook.

21. A tire demounting tool according to claim 20, wherein the plurality of ridges comprise opposite lateral sides of a crease extending into at least a portion of the forward-facing surface of the lever arm.

22. A tire demounting tool according to claim 18, wherein the lever arm widens toward the tip portion.

23. A tire demounting tool according to claim 22, wherein the tip portion narrows toward an outer terminal edge.

24. A tire demounting tool according to claim 18, wherein the tip portion projects forward from the second lever arm segment to an outer terminal edge.

25. A tire demounting tool according to claim 24, wherein the tip portion tapers in width dimension toward said terminal edge.

26. A tire demounting tool according to claim 18, wherein a rearward surface of the bend portion is configured substantially flat.

27. A tire demounting tool according to claim 18, wherein the ball portion has a curvature along a rearwardly directed surface substantially complimenting a tire external curvature.

28. A tire demounting tool comprising:
a handle;
a radially outward directed lever arm affixed to a forward end of at least one end of said handle and comprising:
 a heel portion;
 a first arm segment connected to said heel portion and extending rearward therefrom;
 a second arm segment connected to the first segment at a bend portion and extending forwardly therefrom and defining with said first arm segment a forwardly opening crook; and
 a tip portion connected to the second arm segment at a remote end of the lever arm; and
 wherein the tip portion connects to the second arm segment at a knuckle and extends forwardly therefrom.

29. A tire demounting tool according to claim 28, wherein the tip portion tapers from the knuckle to a terminal end.

30. A tire demounting tool according to claim 28, wherein the second arm segment includes a forwardly projecting ball portion positioned proximate the bend portion.

31. A tire demounting tool according to claim 28, wherein an upper surface of the lever arm includes at least one longitudinal ridge extending along at least a portion of the lever arm defining said crook.

32. A tire demounting tool according to claim 31, wherein the one gripping ridge comprises a lateral side of a crease extending into the upper surface of the lever arm.

33. A tire demounting tool according to claim 28, further comprising a second outwardly directed lever arm affixed to an opposite end of the handle and comprising:
 a heel portion;
 a first arm segment connected to the heel portion and extending rearwardly therefrom;
 a second arm segment connected to the first segment at a bend portion and extending forwardly therefrom and defining with the first arm segment a forwardly opening crook; and
 a tip portion connected to the second arm segment at a remote end of the lever arm.

34. A tire demounting tool according to claim 33, wherein the second arm segment of the second lever arm comprises a forwardly projecting ball portion positioned proximate to said tip portion.

35. A tire demounting tool according to claim 34, wherein the ball portion has a curvature along a rearwardly directed surface substantially complimenting a tire external curvature.

36. A tire demounting tool comprising:
a handle;
a working end extending axially from the handle, the working end comprising:
 a heel portion;
 an elongate lever arm extending radially outward from the heel portion and comprising:
  a. an open crook positioned adjacent the heel portion and configured to receive the first wheel rim edge flange therein;
  b. an elongate lever arm body portion extending from the crook and having an axial reach adapted to span the wheel rim to a distal bead of the tire;
  c. a tip portion connected to a remote end of the lever arm body portion,
  wherein the tip portion connects to the lever arm body portion at a knuckle and extends at an angle therefrom.

37. A tool according to claim 36, wherein the lever arm body portion widens toward the tip portion.

38. A tool according to claim 36, wherein the tip portion narrows toward an outer terminal edge.

39. A tool according to claim 36, wherein the crook is defined by first and second lever arm segments intersecting at a bend.

40. A tire demounting tool comprising:
a handle;
a working end extending axially from the handle, the working end comprising:
 a heel portion;
 an elongate lever arm extending radially outward from the heel portion and comprising:
  a. an open crook positioned adjacent the heel portion and configured to receive the first wheel rim edge flange therein;
  b. an elongate lever arm body portion extending from the crook and having an axial reach adapted to span the wheel rim to a distal bead of the tire;
   1. wherein the lever arm body portion comprises an arcuate ball portion extending from the crook toward the tip portion
   2. a portion connected to a remote end of the lever arm body portion.

41. A tool according to claim 40, wherein the tip portion connects to a remote end of the ball portion at a knuckle and extends at an angle therefrom.

42. A tool according to claim 40, wherein the lever arm body portion further comprises a ball portion extending from the crook toward the tip portion, the ball portion having a curvature along a surface substantially complimentary to an external curved surface of the tire.

43. A tire working tool for disengaging a tire bead from a wheel rim of the rim type having first and second edge flanges spaced apart a distance, the tool comprising:
a handle;
a working end extending axially from the handle, the working end comprising:
 a heel portion;
 an elongate lever arm extending radially outward from the heel portion and comprising:
  a. an open crook proximately positioned to the heel portion defined by first and second lever arm segments intersecting at a bend portion and configured to receive the first wheel rim edge flange therein;
  b. an elongate lever arm body extending from the second lever arm segment and having an axially reach adapted to span the wheel rim to a distal bead of the tire near the second edge flange of the wheel rim;
  c. a ball portion of the lever arm body having a curvature substantially complimentary to an external curved surface of the tire; and
  d. a tip portion connected to a remote end of the lever arm body.

44. A tire working tool according to claim 43, wherein the tip portion connects to the ball portion at a knuckle.

45. A tire working tool according to claim 44, wherein the tip portion tapers from the knuckle to a terminal end.

46. A tire working tool according to claim 43, wherein the curvilinear ball portion is located between the tip portion and the bend portion of the lever arm.

47. A tire working tool according to claim 46, wherein the curvilinear ball portion connects to the tip portion at a knuckle.

48. A tire working tool for disengaging a tire bead from a wheel rim of the rim type having first and second edge flanges spaced apart a distance, the tool comprising:

a handle;

a working end extending axially from the handle, the working end comprising:

a heel portion;

elongate lever arm means extending outward from the heel portion and comprising:

a. open crook means positioned along the lever arm and configured to receive the first wheel rim edge flange therein;

b. elongate ball portion means extending from the open crook means and terminating at a tip portion, the ball portion means having an axial reach adapted to span the wheel rim to a distal bead of the tire near the second edge flange of the wheel rim.

49. A tool according to claim 48, wherein the ball portion means has a radiussed portion substantially complimentary to an external radiussed surface of the tire.

50. A tool according to claim 48, wherein the tip portion connects to the ball portion means at a knuckle.

51. A method of working a tire bead away from a wheel rim having first and second edge flanges spaced apart a distance, the method comprising the steps of:

a. positioning a working end of an elongate tool adjacent the first wheel rim edge flange, the working end comprising a heel portion; a bend portion defining a crook adjacent to the heel portion; an elongate ball portion extending from the bend portion; and a remote tip portion connected to a remote end of the ball portion;

b. inserting the working end of the tool between a disengaged first bead of the tire and the wheel rim until the crook receives the first edge flange of the wheel rim therein and the elongate ball portion spans the wheel rim to a distal second bead of the tire near the second edge flange of the wheel rim;

c. positioning the tip portion of the working end of the tool between the second bead of the tire and the second edge flange of the wheel rim;

d. leveraging the elongate ball portion and the tip portion upward using the bend portion of the tool working end as a fulcrum;

e. prying the second bead of the tire away from the second edge flange of the wheel rim utilizing the tip portion of the tool working end.

52. A method according to claim 51, further comprising the step of sliding the second tire bead along the ball portion of the tool working end and over the bend portion of the tool working end.

53. A method according to claim 51, further comprising the step of cradling the tire against a curved surface of the ball portion of the tool working end as the tip portion pries the second bead of the tire away from the second edge flange of the wheel rim.

\* \* \* \* \*